Sept. 30, 1969 C. A. CRAFTS 3,470,478

FSK AND PSK WAVE RECEIVER

Filed Aug. 21, 1964 4 Sheets-Sheet 1

INVENTOR

CECIL A. CRAFTS

BY Browne, Schuyler & Beveridge

ATTORNEYS

INVENTOR
CECIL A. CRAFTS

BY Brown, Schuyler & Beveridge
ATTORNEYS

Sept. 30, 1969 C. A. CRAFTS 3,470,478

FSK AND PSK WAVE RECEIVER

Filed Aug. 21, 1964 4 Sheets-Sheet 3

INVENTOR
CECIL A. CRAFTS

BY Browne, Schuyler & Beveridge
ATTORNEYS

INVENTOR.
CECIL A. CRAFTS
BY
Browne, Schuyler & Beveridge
ATTORNEYS

United States Patent Office 3,470,478
Patented Sept. 30, 1969

3,470,478

FSK AND PSK WAVE RECEIVER

Cecil A. Crafts, Santa Ana, Calif., assignor to Robertshaw Controls Company, Richmond, Va., a corporation of Delaware Filed Aug. 21, 1964, Ser. No. 391,216
Int. Cl. H04b *1/16*
U.S. Cl. 325—320 12 Claims

ABSTRACT OF THE DISCLOSURE

Angular modulations impressed upon a carrier wave cause changes in wave periods at the instant of phase shift, or throughout an interval of frequency shift. Apparatus of this invention marks the occurrence of all axis-crossing of one sign in a received wave and generates first, second, third (and optionally fourth) adjacent periods established from the beginning of each received AC wave. These periods are adjustable to provide selectivity without conventional filtering, eliminating periods longer or shorter than set limits thereby to respond only to narrow limits of deviation in phase-angle-modulated periods. A fourth period may be used in a cascade of periods totaling a maximum wave period to be received, effecting a further frequency or phase selection similar to a rejection notch in conventional filtering.

This invention relates generally to digital data communication and more particularly to wholly digital processing steps for FSK and/or PSK signals modulated on a carrier wave.

A number of prior systems have been devised for the recovery of frequency modulation information from a carrier wave. Other systems have involved frequency shift keying in which the transmitter actually sends two frequencies which alternate with each other in accordance with an information signal of generally square wave type. Most receivers for keyed phase or frequency modulation generally have used resonant circuits and reactive components such that information signals of square wave form are degraded, or have a reduced signal-to-noise ratio, or are complicated and expensive, as well as requiring considerable equipment space. For these and other reasons it is desirable to avoid all reactive circuits except as required in bandpass filters. It is also desirable to utilize the simplest possible processing steps so that binary information may be produced with better certainty of result and at a minimum equipment expense in circuits with fully solid state components operating as switches, sometimes called "Class D" amplification.

It is accordingly an object of this invention to provide improved means of deriving digital information by wholly digital methods from keyed frequency shifts in transmitted waves.

Another object is to provide a simple receiver for the recovery of data transmitted by phase shift keying of a wave.

A further object is to provide a frequency detector using cascaded multivibrators for distinguishing one transmitted frequency or phase condition from another, and simple coincidence circuits to provide a square wave output information signal.

A still further object of the invention is to provide means and method for broadening the tolerance region of a receiver for binary data transmitted as keyed frequency shifts.

These and other objects of the invention will be better understood as the description proceeds in connection with the drawings in which.

Figure 1:
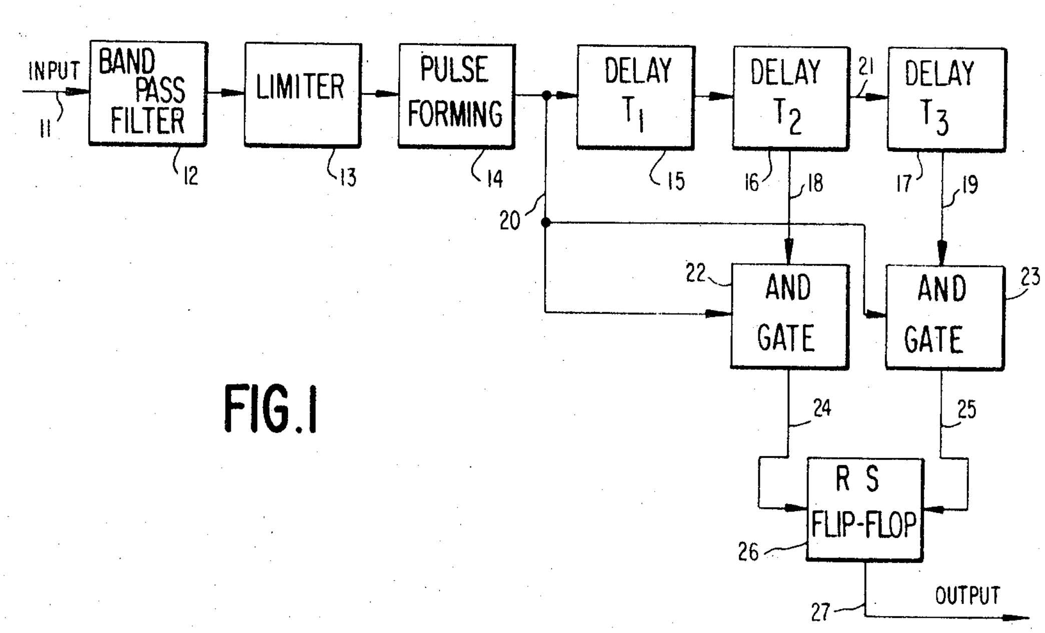
FIG. 1 is a block diagram of a receiver according to the present invention.
Figure 1A:
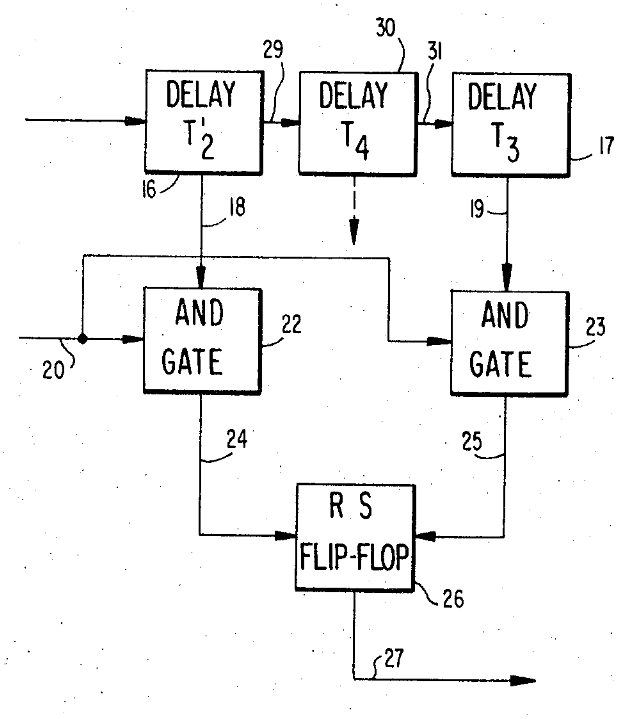
FIG. 1A is a block diagram of circuitry which may be added to that of FIG. 1.
Figure 4:
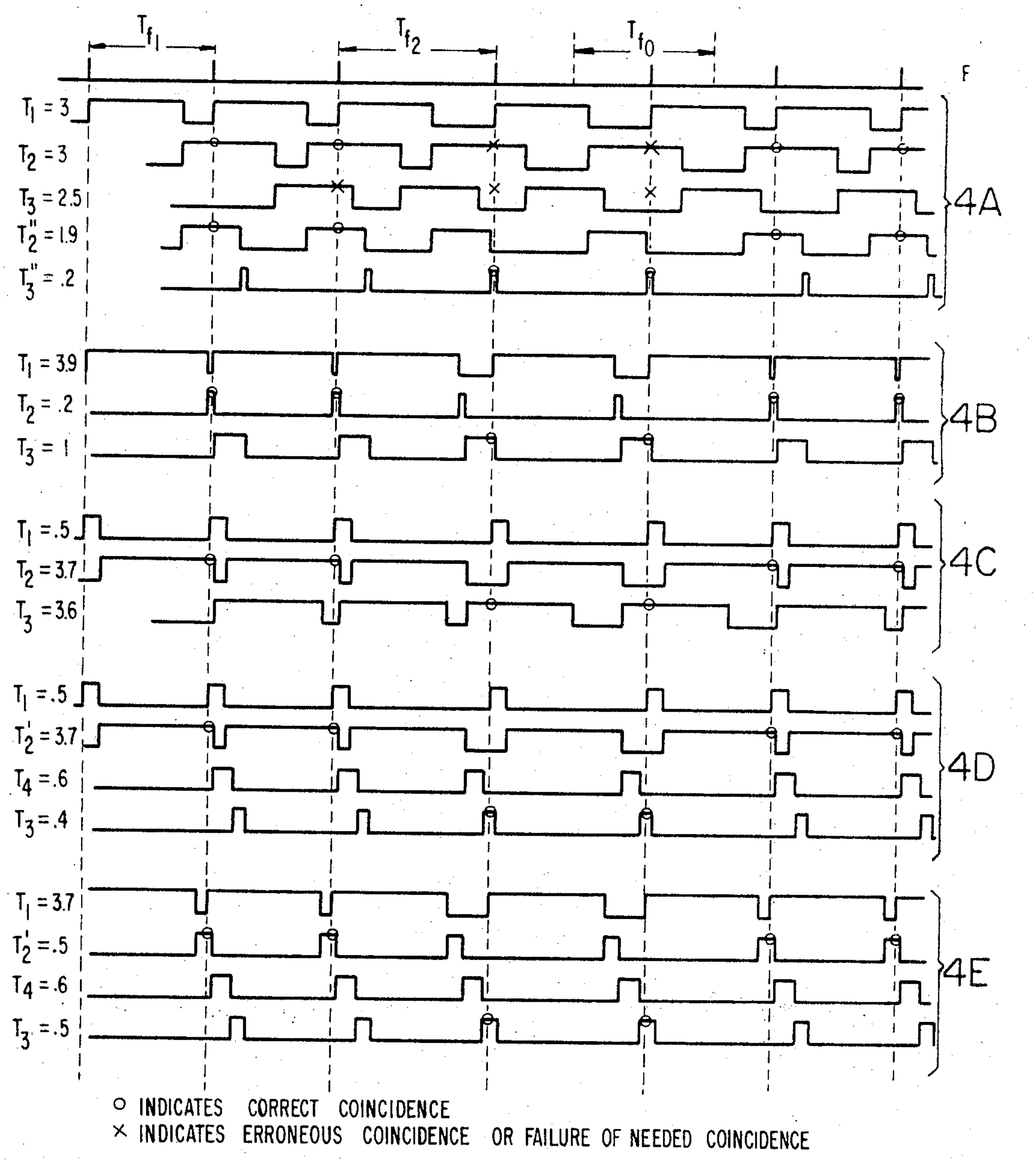
Figure 5:
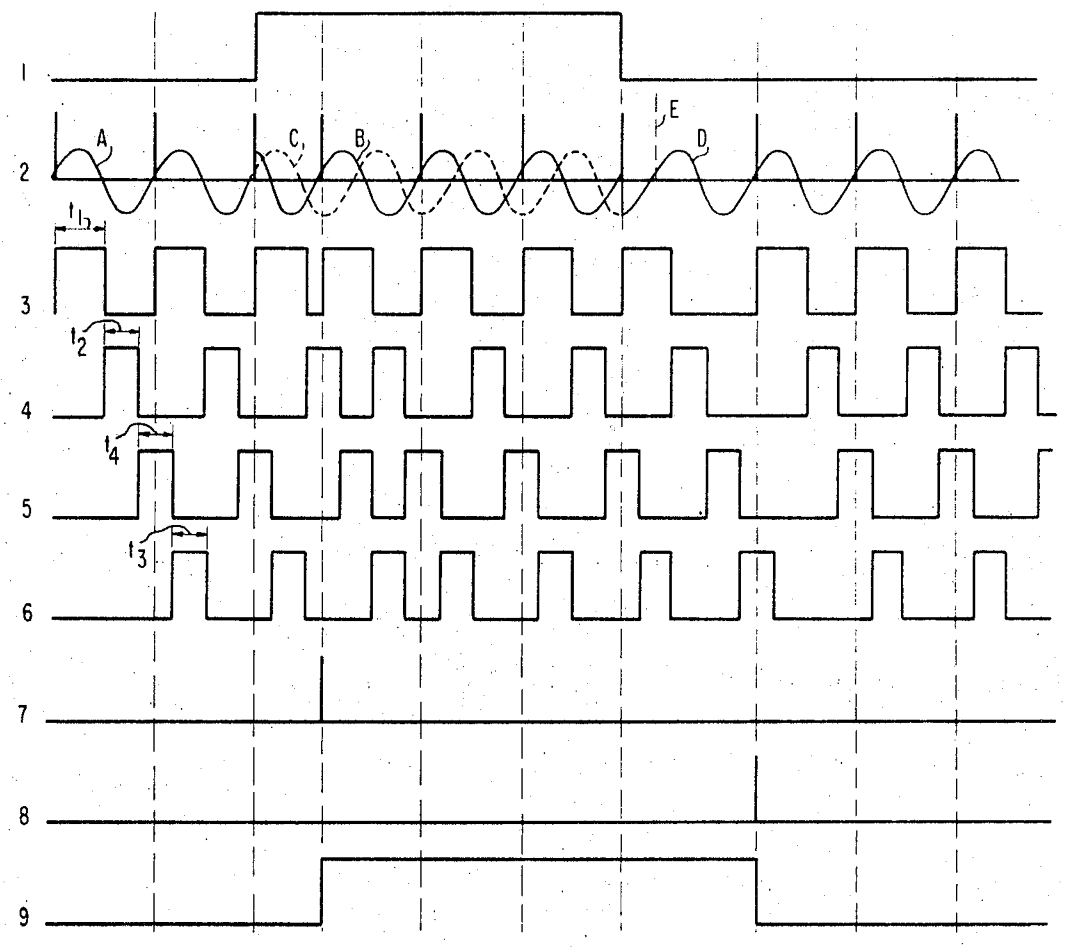

FIGS. 4A–E illustrate a number of conditions and resulting waveforms illustrating operation of apparatus according to FIGS. 1 and 1A; and FIG. 5 illustrates by pulse timing diagrams application of the system of FIG. 1A to detection of PSK information signals.

According to this invention a signal of one frequency channel is received and separated from any multiplexed channel of different frequency limits by means of bandpass filters, or the receiver may operate on an isolated channel without the bandpass filter. Wave squaring or limiting, with amplification, is preferably employed to provide squared waves of rapid rise time for negative-to-positive axis crossing of the received wave. A pulse forming circuit produces a pulse for each such axis crossing and this pulse triggers a first multivibrator which may be a monostable circuit, referred to as a univibrator, producing a square-topped pulse. A second multivibrator produces a second square pulse at the termination of the pulse from the first multivibrator. A third multivibrator produces a square pulse commencing at the termination of the pulse from the second multivibrator. A pair of AND gates are connected to select the pulses from the second multivibrator which are coincident with pulses of one frequency produced by the pulse forming circuit to provide in one output channel an output only when the pulses from the pulse shaping circuit coincide with outputs of the second multivibrator. Square pulses from the third multivibrator will be coincident with pulses from the pulse shaping circuit when a lower frequency input wave is received, determined by an AND circuit which establishes this coincidence and has an output when the lower frequency wave is received. The two AND circuits have outputs respectively running to the set and reset terminals of a reset flip-flop circuit of conventional type. The output of this circuit is a square wave having one constant D.C. value for input waves of the first frequency and a different D.C. value for input waves of a second frequency.

Proceeding now to a more detailed description of the invention, it will be noted that FIG. 1 illustrates the essential features of an FSK data communication detector in its basic form. Ordinarily data communication at one frequency is mixed with a number of compatible frequencies each modulated with an information signal and multiplexed for transmission over a line or radio communication link. The bandpass filter illustrated at 12 serves primarily to separate the frequency channels corresponding to the multiplexed signals. It will be understood that data channels may be in separate lines or radio links so that the bandpass filter may be omitted, or it may be employed merely to filter out noise and other unwanted signals. It is contemplated that a source of FSK signals is received on line 11 from any desirable receiver apparatus (not shown), and is passed either to bandpass filter 12 or directly to limiter 13, as may be desired, apparatus ahead of the limiter being any suitable input means.

Limiter 13 is a conventional component of well known type, ordinarily consisting of several stages, the purpose of which is to provide a series of flat topped waves in which the rise time between positive and negative voltage excursions is made very short, with the result that an essentially square wave symmetrical about a zero voltage is obtained. The number of stages in the limiter is selected in accordance with the need for precision in determining the exact axis-crossing times for the frequency being received at each instant.

From the limiter 13 the square wave is passed to a pulse forming circuit 14 which also may be one of various well known types. In its simplest form the pulse forming circuit may be merely a capacitor with a resistive connection to ground, serving as a differentiator to provide a positive spike at each positive-going axis crossing of the square wave. Pulse forming circuit 14 normally also includes a clipper circuit for the purpose of eliminating the spikes corresponding to the negative-going axis crossings at the trailing edge of the positive excursions. The negative-going excursions may be used instead of the positive excursions by suitably inverting other pulse generations and responses. Various types of oscillators may also be employed to respond with a sharp signal corresponding to axis crossings of the output from limiter 13. Circuit 14 output is hereinafter referred to as though it consisted merely of a spike extending from the horizontal axis vertically, to represent a sharp differentiation spike triggered at the instant of positive-going axis crossing, for each incoming wave received in the input circuitry.

Delay circuits, 15, 16 and 17 of FIG. 1 function to provide successive timings necessary to determine whether a first or second condition of the FSK signal is received. These delay circuits are preferably of the monostable multivibrator (or univibrator) type and are responsive to a voltage pulse in a conventional manner to produce timed intervals each commencing at a precise point in a shaped pulse. Operation of the detector depends upon the interrelationship between the timed intervals provided by circuits 15, 16 and 17. These circuits shown as multivibrators will be understood to constitute conventional interval gating means, timed as herein disclosed. It would be feasible to employ any other rapid timing circuitry such that a positive pulse in one direction triggers a first timed pulse and provides a sharp cutoff signal available for triggering the next circuit 16, 17 or 30. It will also be appreciated that a bistable circuit may be employed for a successive pair of the timed pulse generators so long as the first delay period ends as the second delay period commences and the third period commences as the second terminates. A number of specific circuits to accomplish these time relationships are known and may be used as convenient to cause a time pulse to suddenly commence and suddenly terminate, with the succeeding time pulse commencing in the shortest possible time after the termination of the preceding pulse. The mode of detection of frequency shifts depends on the relationship between the time intervals generated by delay circuits 15, 16, 17 and 30 and the frequencies $f_1$, $f_2$ and the difference in frequency, $\Delta f$, therebetween.

For better understanding of the operation of this invention, the incoming frequency is designated $f_1$ for one frequency, and $f_2$ for the second frequency, and the median frequency is designated $f_0$. It will be convenient to refer to these frequencies in terms of their periods in which the period of $f_1$ is $T_{f_1}$, the period of $f_2$ being $Tf_2$, and the median period being $Tf_0$. A positive output wave from delay circuit 15 commences with each positive spike from circuit 14 delivered to line 20 and to delay circuit 15. The delay period for circuit 15 is designated $T_1$ and extends from the instant of the receipt of the spike from circuit 14 to the instant when the pulse decreases to the point of turning on circuit 16, at which time its period $T_2$ commences. At the termination of $T_2$, a third period $T_3$ commences since circuit 16 turns off at the end of $T_2$ and has an output applied directly to initiate delay circuit 17. Circuits 16 and 17 have outputs at 18 and at 19, respectively, each being in this illustration a positive voltage pulse of adjacent intervals $T_2$ and $T_3$ following $T_1$, which follows each axis crossing of the incoming A.C. signal. The timing tolerances for circuits 15, 16 and 17 will be described in detail hereinafter, along with means for tuning and varying the response of the detector circuit to differing input frequencies.

A voltage spike corresponding to the commencement of each cycle of incoming frequency $f_1$ or $f_2$ is taken by line 20 not only to delay circuit 15 but also to an AND gate 22 and to an AND gate 23. AND gate 22 is supplied with an input from line 18 which has a positive voltage thereon whenever delay circuit 16 produces an output during the interval $T_2$. AND gate 23 is supplied by line 19 with a positive input from delay circuit 17 to give an output voltage whenever interval $T_3$ coincides with a pulse from circuit 14. AND gates 22 and 23 are connected by lines 24 and 25 to a conventional reset flip-flop circuit 26 which merely serves to generate a square wave output on line 27 which is positive upon actuation of AND gate 22 by way of line 24 and negative upon actuation of AND gate 23 by way of line 25. Obviously, the choice with respect to positive and negative signals throughout may be reversed and otherwise altered in various ways according to conventional practice without changing the operation already described. Line 27 thus has an output which is relatively positive for one frequency of incoming signal and relatively negative for the other received frequency.

Frequency shift keyed signals may occupy a narrow or a broad frequency band in accordance with the service to which adapted. Under severe noise or interference conditions it would be feasible to employ something in the order of 50% change in frequency from $f_1$ to $f_2$, but for service where bandwidth must be kept to a minimum only a few percent change in frequency may be desirable. A frequency shift as herein shown in from 10% to 20% for ease of illustration.

Figure 2:
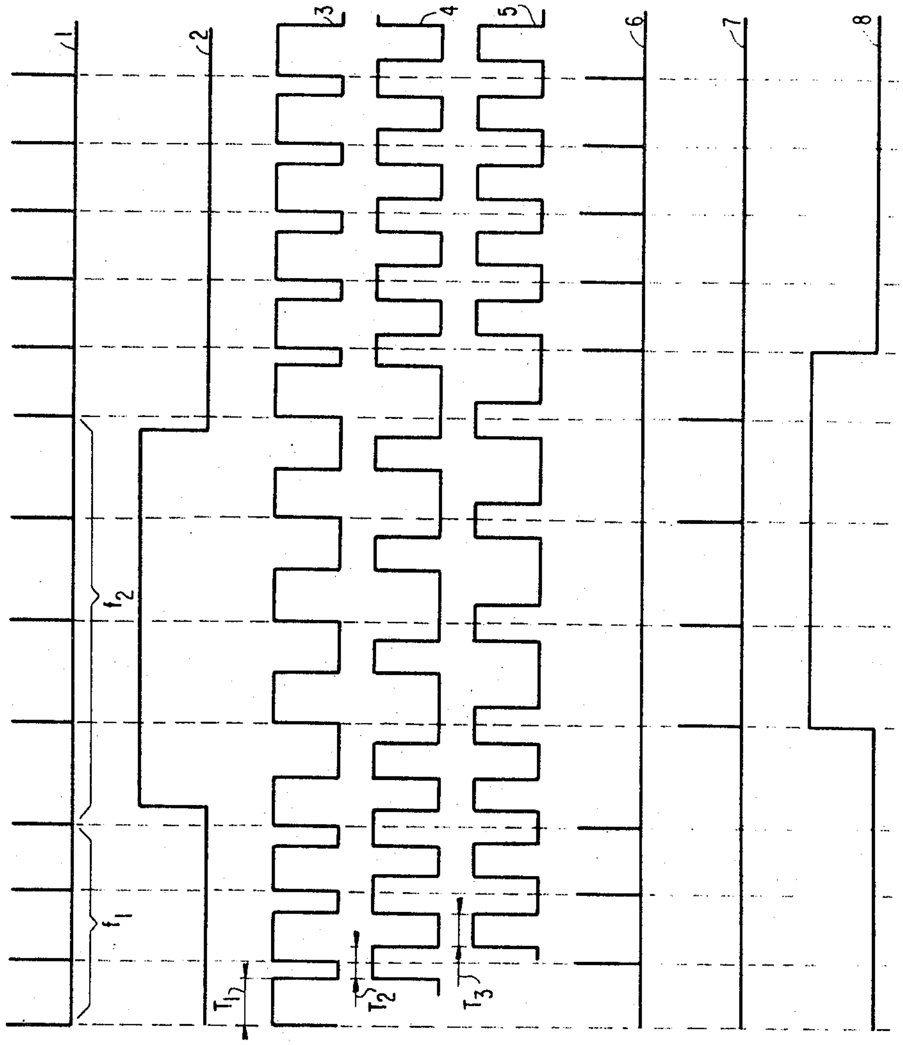
FIG. 2 is a diagrammatic showing of waveforms illustrating frequency detection according to FIG. 1.

FIG. 2 illustrates ideally the relationship between the spikes corresponding to the two frequencies received at line 1 resulting from modulation at the transmitter by the wave of line 2, employed for keying the transmitter thereby to produce a shift from $f_2$ to $f_1$ or $f_1$ to $f_2$. Line 3 illustrates one timing for the delay circuit 15 in which $T_1$ is substantially more than half of the period $T_{f_1}$. Lines 4 and 5 illustrate the operation of circuits 16 and 17 in which their periods are ideally nearly alike so that $T_2$ is approximately equal to $T_3$. Line 6 illustrates the output of one of the AND circuits 22 or 23, and line 7 illustrates the output of the second AND circuit. Line 8 represents the square wave output corresponding to the square wave input of line 2 except for a slight delay of a part cycle needed for determining coincidence between input frequency spikes and periods $T_2$ and $T_3$, respectively.

Figure 3:
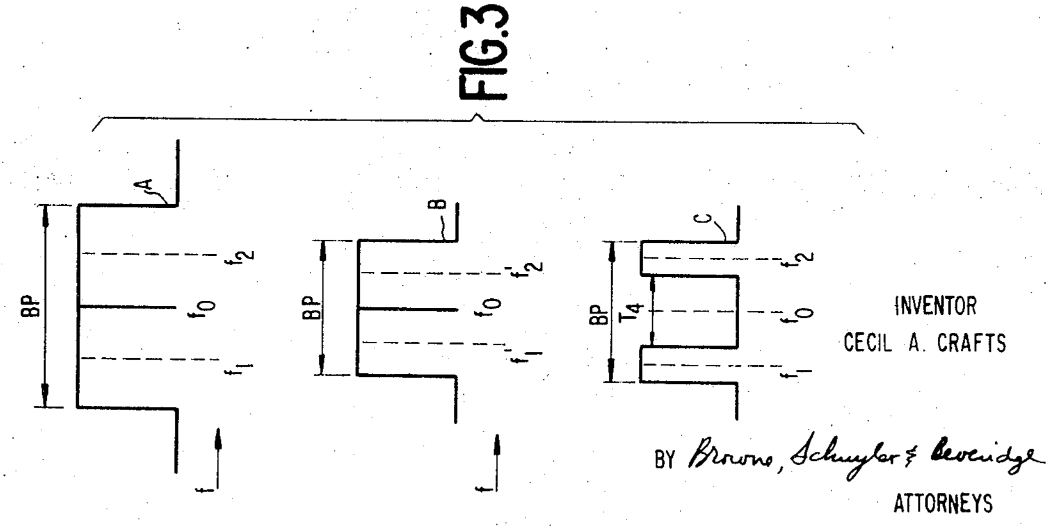
FIG. 3 illustrates bandwidth and frequency deviation tolerance of apparatus according to this invention.

FIG. 3 illustrates the relationship between the frequencies $f_1$, $f_2$, $f_0$ and the bandpass of a filter in a typical receiver. In A of FIG. 3, the bandpass is illustrated as extending approximately twice the frequency range between $f_1$ and $f_2$ in order that the transmitted frequencies may lie approximately midway between the lower frequency limit and $f_0$, in one case, and between $f_0$ and the upper frequency limit in the other case. This corresponds to $$\Delta f=2(f_1-f_2)$$

In B of FIG. 3, a narrower limit bandpass filter is employed since $f_1$ and $f_2$ lie closer together, but still remain optimally midway between the upper, lower and midfrequency limits for $f_1'$ and $f_2'$. $\Delta f'$ is preferably twice the difference between $f_2'$ and $f_1'$. In C of FIG. 3, $f_1$ and $f_2$ are as in A, but the bandpass is intentionally made smaller for the purpose of excluding noise. Possible noise at a frequency range surrounding $f_0$ is eliminated by rendering the frequency range near $f_0$ ineffective to operate either AND circuits. This will be described further in connection with FIG. 1*a*, but it is noted that a new period $T_4$ centers about $f_0$, in the optimum adjustment, such that frequencies midway between $f_1$ and $f_2$, or thereabouts, cannot produce detectable outputs.

FIG. 1*a* illustrates a modification of FIG. 1 in which the line 21, which takes an output from delay circuit 16, is replaced by line 29 to delay circuit 30 and thence by line 31 to delay circuit 17 for the purpose of supplying interval $T_4$ between the termination of $T_2$ and the commencement of $T_3$. This alternative construction generally follows the same requirements as to timing of the delay circuits as in FIG. 1 with the exception that $T_2$ is now replaced by $T_2'$ plus $T_4$ as will be later explained. AND gates 22 and 23 are operated by delay circuits 16 and 17 in coincidence with received frequency spikes on line 20 as previously described.

In order that the detector operate as previously stated to produce a square wave output corresponding to the keying signal employed in the transmitter we assume first that only two frequencies are transmitted, referred to as $f_1$ and $f_2$, having a midfrequency designated $f_0$. A spike generated at the commencement of each cycle of $f_1$, as well as the commencement of each cycle at the frequency $f_2$, is illustrated on line 1 of FIG. 2 and on the first line of FIG. 4, there designated F. Thus the period $T_{f_1}$ corresponds to $f_1$, and the period $T_{f_2}$ corresponds to $f_2$, while $T_{f_0}$ is a period for the median frequency between $f_1$ and $f_2$. Lines 3, 4 and 5 of FIG. 2 and the various lines beneath F of FIG. 4 illustrate the result of varying the periods $T_1$, $T_2$, $T_3$ and $T_4$ with respect to the periods $T_{f_1}$, $T_{f_2}$. The diagrams of FIG. 3 illustrate the selection of periods $T_2$ and $T_3$ such that spikes of the incoming wave at $f_1$ or at $f_2$ coincide with the middle of $T_2$ or of $T_3$, depending on the frequency then being keyed. It is seen further that $T_1$ has been adjusted such that $T_1$ plus $T_2$ is equal to $T_{f_0}$, which is an optimum adjustment for the system for resolution of frequency shift in the presence of noise or shifting frequencies of an undesired type. When $T_1$ plus $T_2$ equals $T_{f_0}$ and $T_2=T_3$ it will be observed that any frequency shift may be resolved within the range from zero to $\Delta f=2(f_1-f_2)$. Frequency jitter over wide limits may therefore be tolerated, within the limits $\pm T_2$ if $T_1+T_2$ have initially been adjusted to $T_{f_0}$. It may also be noted that the frequency shift detector also tolerates a considerable misadjustment of $T_1+T_2$ from the optimum value of $T_{f_0}$. In a system in which the frequency jitter is within known limits the variation in $T_2$ and $T_3$ may be set to accommodate those limits, and $T_1$ may be adjusted to give the approximate relation to $T_{f_0}=T_1+T_2$. It will be obvious that this system may be tuned over considerable limits merely by the variation of the "on" time for the multivibrator producing $T_1$.

Ideal operation of the detector involves special relationships between multivibrator delay periods, the periods corresponding to the received frequencies. Thus we set limits for adjustment in the multivibrator periods at which the system operates ideally, and conversely, having set the periods of the multivibrators, a variety of frequencies may be received; or alternatively, the frequency tolerance may be kept small, for the purpose of excluding noise, according to the following relationships:

$$2T_{f_1}>T_1+T_2+T_3>T_{f_2}>T_1+T_2>T_{f_1}$$

while $$T_2+T_3>(T_{f_2}-T_{f_1})$$

and $$T_{f_1}>T_1,\ T_2,\ T_3$$

For the condition when $T_1+T_2$ is made about equal to $T_{f_0}$ we make $T_3>\frac{1}{2}(T_{f_1}-T_{f_2})$, in which $T_3$ preferably approximates $T_{f_2}-T_{f_1}$.

Also, for the modification where a fourth multivibrator is used having a period $T_4$, as in FIG. 1*a*, $T_2'+T_4$ replaces $T_2$, thus:

$$T_1+T_2'+T_4+T_3>T_{f_2}>T_1+T_2'+T_4>T_{f_1}$$

FIG. 4 illustrates a number of the conditions which may be encountered in practice to show the processing of FSK signals by apparatus of FIGS. 1 and 1*a* according to these relationships. In the FIG. 4 diagrams bracketed at 4A, $T_1$ is taken to have an arbitrary value 3.0 while the period $T_{f_1}$ is 4 and the period $T_{f_2}$ is 5. It will be noted that when $T_2$ is also about equal to 3, a coincidence is obtained at the first AND gate regardless of which frequency is received for the reason that $T_1+T_2$ is greater than $T_{f_2}$. The third line illustrates $T_3=2.5$, and illustrates the fact that when $T_1+T_2+T_3$ is greater than $2T_{f_1}$ a coincidence is obtained in the second AND gate even though the frequency corresponds to one which should be effective only at the first AND gate. It will be apparent that any time when $T_1+T_2$ is less than $T_{f_1}$ no coincidence will be obtained for the first AND gate corresponding to $T_{f_1}$. The line labeled $T_2''=1.9$, when taken with $T_1=3$, operates properly to provide a coincidence in the first AND gate centered in the interval $T_2''$. The line labeled $T_3''=.2$ illustrates a properly operating system when taken with $T_1=3$ and $T_2''=1.9$, for the reason that the three periods lie between $2T_{f_1}$ and $T_{f_2}$. It would be understood that $T_2$ and $T_3$ would preferably be adjusted to more nearly equal periods in order that their variation tolerances may be more nearly alike, and the system tolerance made larger without increase of susceptibility to noise.

The lines bracketed at 4B illustrate adjustment of the first multivibrator to nearly its maximum useful value for $T_{f_1}=4$, $T_1=3.9$. $T_2''$ is there set equal to .2 being sufficient to provide similar tolerance, when added to $T_1$, above and below the value $T_{f_1}$ required to indicate the coincidence in the first AND gate. $T_3$ is shown a value of 1.0, which is approximately the minimum value of $T_3$, $T_1$ and $T_2$ already being set, to satisfy the relation $T_1+T_2+T_3>T_{f_2}$. A much larger value for $T_3$ of course may be used so long as the sum of three periods is less than $2T_{f_1}$.

The lines bracketed at 4C illustrate a very short $T_1$ period, $T_1=.5$, and $T_1$ and $T_3$ are selected in accordance with specified relationships to have near maximum values in each case. It should be appreciated that the periods illustrated in 4A, 4B and 4C are relative in duration, and may represent differing fractions of the period of an incoming frequency resulting from deviation either at the transmitter or the receiver. The illustrations of 4A, 4B and 4C show successful operation, even though $T_1+T_2$ is not equal to $T_{f_0}$, as under conditions of frequency shift either at the transmitter or the receiver. The illustrations on lines 3, 4 and 5 of FIG. 2 will be found to correspond approximately to a condition midway between 4B and 4C wherein $T_1$ would be about 2.8, $T_2$ about 1.7, and $T_3$ of equal period with the $T_2$.

The lines bracketed at 4D and 4E illustrate adjustment of apparatus according to FIG. 1*a* in which the fourth multivibrator having a period $T_4=.6$ is subtracted from the period otherwise required for $T_2$ and the lines below $T_1$ in 4D and 4E are accordingly labeled $T_2'$. The same extremes of variation in $T_1$ might be illustrated as in 4B and 4C but are here illustrated as .5 and 3.7. It will be noted that for a very short period $T_1$, $T_2'$ may be quite long such that the sum $T_1+T_2'$ is always greater than $T_{f_1}$ while $T_1+T_2'+T_4$ must be kept less than $T_{f_2}$. However, for many purposes a choice illustrated in 4E is more suitable and in this case $T_1$ is set equal to 3.7 while $T_2'$ is .5, which is also the value for $T_3$. The delay interval $T_4=.6$ is now interposed between the termination of the delay pulse of the second multivibrator and the commencement of the delay pulse from the third multivibrator, according to FIG. 1A. In this arrangement coincidence will be indicated by the first AND gate only within an adjustment range for $T_1+T_2'$ of about .2 either side of the period $T_{f_1}$ while the second AND gate will indicate coincidence only for a range of $T_{f_2}$ which varies by about .2 from the added delays as set in the first, second, third and fourth multivibrators.

It may be seen that periods of the received frequencies bear a variable relationship to each of the delay periods, whereby a considerable tuning tolerance is realized, and that $T_1$ may be used exclusively as the time adjustment by which the receiver is retuned for reception of a considerable range of transmission frequencies. Having set the periods $T_1$, $T_2$ and $T_3$ at a design value for $f_1$ or $f_2$ it will be evident that no change of output occurs as $f_1$ or $f_2$ varies within an operative range which may be broadened or narrowed as required for broad band or highly selective requirements. Tunability is nevertheless retained, since any one of the periods $T_1 \ldots T_4$ may be varied according to a setting of a variable resistor, for example.

As thus far described the invention is particularly adapted to detection or recovery of information causing switching between two transmitted frequencies, or typically an FSK signal without the transmission of a central frequency or carrier wave as such. Essentially, it is a technique for the determination of which of a pair of frequencies is instantly transmitted. By minor modifications the invention is also adaptable to the recovery of PSK signals from a fixed carrier wave and without the usual discriminator circuitry or integration circuitry normally needed for the recovery of phase shift keyed information from a carrier wave. No timing reference or auxiliary apparatus of any kind is needed and only the carrier wave, together with its phase shift information, need be present in the received wave.

For this purpose, the modification shown at FIG. 1A, or its equivalent, is a desirable modification to permit a different mode of operation than that described in connection with the FSK signals. When PSK reception is desired, multivibrators, or their equivalent, may be used to set up a series of intervals corresponding to: (1) an initial period, (2) a period during which an advanced phase axis-crossing interval ends, (3) a period during which the axis-crossing times corresponding to undeviated carrier occur, and (4) a period in which axis-crossings corresponding to a retarded phase occur.

In FIG. 5 an information signal is illustrated at line 1 and at line 2 a phase-shifted carrier wave is illustrated having superimposed thereon the axis-crossing signals produced as by limiting or squaring and differentiating to give pulses at line 2 corresponding to the axis-crossing signals at line 1 of FIG. 2. Line 2 shows at A the undeviated carrier wave of whatever frequency may be received. At B is shown an advanced phase portion of the wave differing from the phase at A as illustrated in the dotted line C. At D the undeviated wave corresponding to the phase at A and at C is also shown. At E is illustrated in dotted line an axis-crossing signal one carrier wave period prior to the next regular axis-crossing signal.

Line 3 illustrates a series of intervals $T_1$ as in FIG. 2 to fix a portion of time during each cycle in which neither type of coincidence may be registered should it occur accidentally. As in the case of FSK signals, the interval $T_1$ may be short or long but is preferably made at least half the period of the received wave for purposes of improving the signal-to-noise ratio, etc. At line 4 a period $T_2$ follows each period $T_1$ and each period $T_2$ terminates prior to the normal time of occurrence of the next axis-crossing signal as shown on line 2. As in the case of FIG. 1A, the period $T_4$ follows the period $T_2$ and preferably centers at the termination of the normal axis-crossing signal of line 2 as shown in line 5. In line 6 the period $T_3$ follows immediately after the termination of the period $T_4$. According to this mode of operation, an advanced phase is shown on line 3 to commence at the pulse immediately following the quickened axis-crossing time, as an advanced phase is keyed at the transmitter, Accordingly, in line 4, the second interval $T_2$ coincides with the first axis-crossing pulse following the advanced phase. In line 6 a period $T_3$ coincides with the axis-crossing signal representing the retarded phase.

Line 7 shows an output pulse from one of the AND circuits corresponding to coincidence between a period of line 4 and an axis-crossing pulse of line 2. Line 8 shows a pulse from the other AND circuit corresponding to a pulse on line 2 coincident with a period $T_3$ of line 6. Line 9 shows the recreated information signal corresponding to the information signal on line 1.

It will be evident by inspection that the normal frequency received, as illustrated in line 2 of FIG. 5, produces the axis-crossing signals initiating periods $T_1$ of line 3 and that an advanced phase produces a shorter than normal "off" time for the multivibrator creating the successive intervals $T_1$ while a retarded phase creates a longer "off" time, as seen on line 3.

It will likewise be evident that the period $T_4$ of line 5 is convenient for the purpose of determining a dead time during which minor and accidental changes of phase will not register to produce an output either of the advanced or retarded phase signal. The interval $T_4$ may be made quite short for this purpose. It will likewise be evident that $T_1$ plus $T_2$ may be made to approximately equal the normal axis-crossing signal spacing of line 2 such that any coincidence occurring during $T_2$ indicates an advanced phase and any coincidence occurring in the interval $T_3$ indicates a retarded phase. In this way the apparatus of FIG. 1 may be employed without the $T_4$ interval illustrated on line 5 to produce an output, as in lines 7, 8 and 9, which is a true information signal corresponding to an advanced phase keying at the beginning at the square pulse of line 1 and a retarded phase at the termination of square wave of line 1.

It is thus contemplated that the apparatus described may be used to receive PSK signals without the addition of the fourth interval laying between the "second" and "third" intervals. For this purpose, the first and second intervals may be made equal approximately to the period of the undeviated carrier wave. It will be evident that an advanced phase causes a shorter interval between axis-crossings of the received wave and that a retarded phase causes a longer interval between axis-crossings of the received wave. Thus if the second multivibrator period terminates and the third multivibrator period commences at approximately the normal axis-crossing time for the received wave, an advanced phase shows as a coincidence in the second interval and a retarded phase as a coincidence in the third interval. While it is possible to employ the three multivibrator schematics of FIG. 1 in this way to resolve paired opposite shifts of phase into a binary output signal, the fourth interval provided by the fourth multivibrator is preferably so adjusted that the normal undeviated carrier period ends in the middle thereof. The duration of this fourth interval is variable and relatively short in the usual PSK system since only a fraction of a cycle is involved in either an advance or a retardation of phase. Ideally, this fourth interval $T_4$ is divided by best adjustment into equal portions occurring before and after the normal period of termination of the undeviated carrier wave, and could be regarded as fourth and fifth intervals, respectively, being portions subtracted from the final part of the second interval and from the initial part of the third interval as shown in FIG. 1.

As described in connection with FIG. 1, the "second" and "third" intervals are the two intervals in which the axis-crossing pulse next after the pulse initiating the first interval (a dead period) may alternatively coincide. For descriptive purposes the "fourth" interval illustrated in FIG. 1A is interposed between the "second" and "third" intervals of FIG. 1. Chronologically speaking, this added interval might be regarded as the third interval, though not equivelent to the third interval, previously described. The mode of operation having been described in terms of intervals $T_2$ and $T_3$ during which a coincidence may usefully occur, it will be appreciated that the modification of FIG. 1A may be described as interposing a "dead" interval between the "second" and "third" intervals described in FIG. 1, or as causing a final portion of the "second" interval, and/or an initial portion of the "third" interval to be dead or inactive for producing an output. This intervening dead portion of time may be used for enhancement of signal-to-noise ratio and makes the detector nonresponsive to frequencies near the central frequency between $f_1$ and $f_2$ transmitted in FSK, and, in PSK, prevents change in output signal during the continued transmission of one information bit, as in FIG. 5.

While the invention has been described with particular reference to processing by single shot multivibrators and associated circuitry, it may be practiced otherwise within the spirit of the present invention and within the scope of the appended claims.

I claim:

1. A receiver for detecting keyed information from an A.C. signal, comprising

FM signal input means;

limiting means for producing squared waves from said A.C. signal;

wave shaping means for producing a pulse indicating each instant of axis crossing in one direction for said squared waves;

first interval gating means responsive to each said pulse to generate a square wave of fixed duration commencing at each said instant;

second interval gating means for generating a square wave on termination of said wave in said first interval;

third interval gating means generating a square wave of fixed duration after termination of said wave in said second interval;

AND gate means connected to pass a first axis-crossing frequency indication during each of said second interval which includes one said instant;

AND gate means connected to pass a second axis-crossing frequency indication during each said third interval which includes one said instant; and means providing an output signal of one value during said first frequency indication and an output signal of a different value during said second frequency indication;

said third interval means including means selecting a period prior to said third interval square wave during which neither AND gate can be actuated and an output is prevented for an axis-crossing frequency between said first and second frequency indications.

2. A receiver according to claim 1 wherein said means providing an output signal operates to maintain said one value of output following receipt of said first frequency until said second frequency is received and to maintain said different value of output following receipt of said second frequency until said first frequency is again received.

3. A detector for PSK modulations of a wave of fixed frequency, comprising means producing squared waves having regular periods according to said frequency with reduced and increased periods corresponding to cycles including advanced and retarded phase keyings of the wave, respectively, means producing a pulse at a fixed time relative to initiation of each period;

means determining a first interval initiated by each said pulse;

means determining a second interval immediately following each said first interval;

means determining a third interval immediately following each said first interval;

means causing an output voltage of one magnitude when a first portion of said second interval includes the instant of a said pulse following the pulse initiating said first interval;

means causing an output voltage of a second magnitude when said third interval includes the instant of a pulse following the pulse initiating said first interval; and means establishing a further interval including a part of said second interval after said first portion, during which an output voltage cannot be initiated.

4. A detector for digital phase modulations of a carrier wave, comprising means producing squared waves of at least two discrete wave lengths differing from the wave length of the carrier wave according to said modulations;

means producing a sharp pulse at a fixed time relative to initiation of each said wave;

means determining a first interval initiated by each said pulse;

means determining a second interval immediately following each said first interval;

means determining a third and fourth consecutive intervals immediately following each said second interval, said three intervals cumulatively exceeding the period of said carrier wave;

means causing an output voltage of one magnitude when said second interval includes the instant of one said pulse following the pulse initiating said first interval; and means causing an output voltage of a second magnitude when said fourth interval includes the instant of one said pulse following the pulse initiating said first interval, said output of one magnitude corresponding to a phase advancement and said output of said second magnitude corresponding to a phase retardation in the carrier wave.

5. A detector according to claim 4 wherein said means determining intervals include multivibrator circuits adjusted to provide said first, second, third and fourth intervals totaling more than the period of a wave including a phase retardation and in which said first and second periods exceed the period of a wave including a phase advancement.

6. A detector for keyed angular modulations of a carrier wave, comprising receiver means generating squared waves from said carrier wave having pulses of like separation between instants of phase shift said pulses having increased separation corresponding to phase retardation modulations and decreased separation corresponding to phase advancement modulations;

means determining a first interval initiated by each said pulse;

means determining a second interval immediately following each said first interval;

means determining a third interval immediately following each said second interval;

means determining a fourth interval immediately following each said third interval; said first, second, third and fourth intervals having a sum exceeding the period of a wave including a phase retardation modulation; and means causing an output voltage of one magnitude when one said pulse coincides with a selected one of said second, third or fourth intervals and of a second magnitude when one said pulse coincides with a second selected one of said second, third or fourth intervals.

7. A detector according to claim 6 wherein said means determining said first, second, third and fourth intervals are adjusted to provide a sum thereof less than twice the period of said wave including a phase advancement and greater than the period of said wave including a phase retardation and wherein the sum of said first and second intervals is less than said period including a phase retardation.

8. A detector according to claim 6, last said means being effective to produce said one magnitude of output voltage following coincidence of one said pulse with a second said interval indicating an advanced phase relative to said carrier wave and said second magnitude following coincidence of one said pulse with said third interval, thereby to produce binary output voltage from successively opposite deviations of phase of said carrier wave.

9. A detector according to claim 6 adapted to produce a binary output signal from a PSK carrier wave received in which said first interval is substantially equal to at least half the unmodulated period of said wave, the sum of said first, second and third intervals is substantially more than the period of said wave, and said second and fourth intervals include axis-crossing times for said wave corresponding to phase advancements and retardations, respectively.

10. In an FM detector operative to resolve a pair of frequencies alternatively transmitted as digital information bits, means generating a pulse train at recurrence times corresponding during each said bit to the frequency instantaneously transmitted;

means generating a first constant interval pulse following each pulse of said pulse train;

means generating a second constant interval pulse commencing at the termination of said first interval pulse;

means generating a third constant interval pulse commencing at the termination of said second interval pulse;

means generating a fourth constant interval pulse commencing at a termination of said third pulse;

means determining coincidence between said second interval pulses and pulses of said train and providing thereupon a voltage output of one magnitude;

means determining coincidence between said fourth interval pulses and pulses of said train and providing thereupon a voltage output of a second magnitude; and means combining said outputs to produce a voltage of at least two magnitudes corresponding to respective information bits transmitted.

11. In a detector according to claim 10, said means generating constant interval pulses including multivibrator circuitry energized and adjusted to provide a total of said first and second interval pulses approximating the median period of said pair of frequencies, said second, third and fourth interval pulses combined exceeding the difference in period of said frequencies.

12. In a detector according to claim 11, said first and second interval pulses being of combined duration less than the mean period of said frequencies, said first, second and third interval pulses being at least the duration of the period of said mean, and said second, third and fourth interval pulses being of combined duration substantially less than said first constant interval pulses.

References Cited

UNITED STATES PATENTS

| | | | |
|---|---|---|---|
| 3,037,568 | 6/1962 | Hannum | 325—320 X |
| 3,233,181 | 2/1966 | Calfee | 325—30 X |

ROBERT L. GRIFFIN, Primary Examiner

WILLIAM S. FROMMER, Assistant Examiner

U.S. Cl. X.R.

178—66, 67; 329—128